United States Patent [19]

Farmer

[11] Patent Number: 4,795,856
[45] Date of Patent: Jan. 3, 1989

[54] APPARATUS FOR SUPPORTING FIBER OPTIC OR RELATED CABLE

[75] Inventor: Marion R. Farmer, Shelby County, Tenn.

[73] Assignee: Aluma-Form, Inc., Memphis, Tenn.

[21] Appl. No.: 21,716

[22] Filed: Mar. 4, 1987

[51] Int. Cl.⁴ .............................................. F16L 3/22
[52] U.S. Cl. ................................... 174/40 R; 248/68.1; 248/218.4
[58] Field of Search ............... 174/40 R, 43, 44, 45 R, 174/146, 149 R, 158 R, 173; 248/65, 67.7.68.1, 69, 218.4, 219.1, 219.2, 219.3, 219.4; 211/60.1, 107; 52/687, 697; 138/108; 256/3, 11; D8/354, 356, 364, 366, 372

[56] References Cited

U.S. PATENT DOCUMENTS

| | | | |
|---|---|---|---|
| D. 219,343 | 12/1970 | Rinaldi | 174/45 R X |
| D. 219,363 | 12/1970 | Mackness | D8/356 X |
| 2,022,386 | 11/1935 | Pittman | 174/158 R X |
| 2,915,580 | 12/1959 | Gill et al. | 174/146 X |
| 3,463,870 | 8/1969 | Eucker | 174/146 X |
| 3,698,691 | 10/1972 | Brown | 256/11 |
| 4,794,751 | 2/1974 | Farmer et al. | 174/40 R |

FOREIGN PATENT DOCUMENTS 36478  9/1913  Sweden .................. 52/697

*Primary Examiner*—Laramie E. Askin
*Attorney, Agent, or Firm*—Paul M. Denk

[57] ABSTRACT

A bracket useful for supporting and holding fiber optic or other cable to a utility pole, or the like, including the bracket having a base member, a shank portion extending integrally therefrom, being curved so as to center the bracket and held cable over its base member, the upper end of the shank portion being bifurcated, integrally formed into a pair of arms, that extend outwardly into the formation of cradle members that support the cable thereon. Tie members in combination with grommets are useful for holding the cable onto the bracket, at each cradle, and at that location between the pair of bracket arms at the location where they are integrally formed extending from the bracket shank portion.

12 Claims, 2 Drawing Sheets

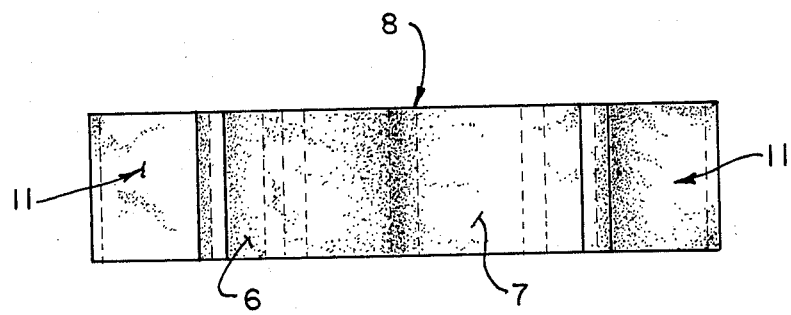
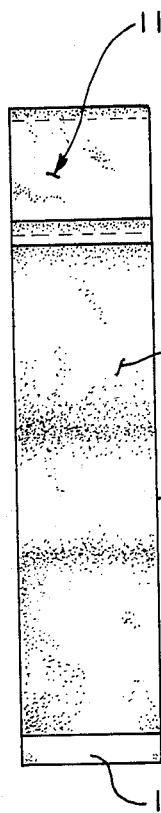
FIG. 4.
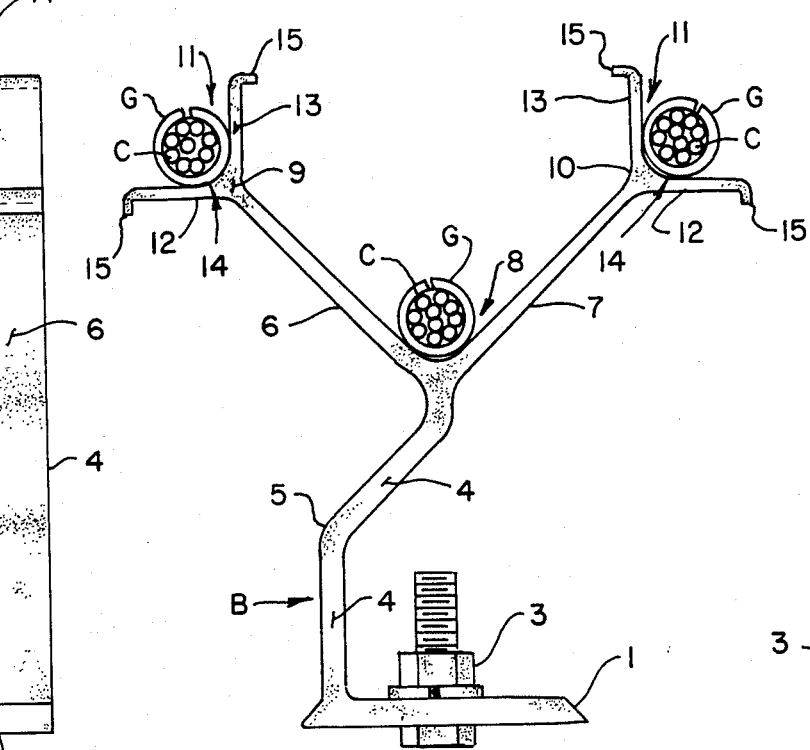
FIG. 3.
FIG. 5.
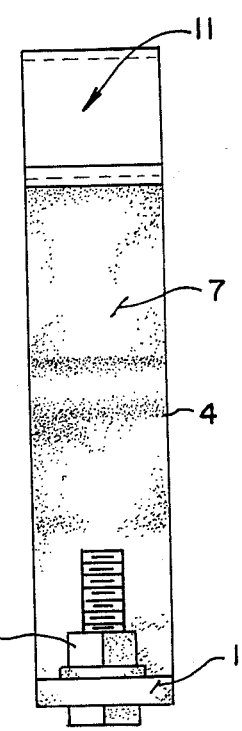
FIG. 6.
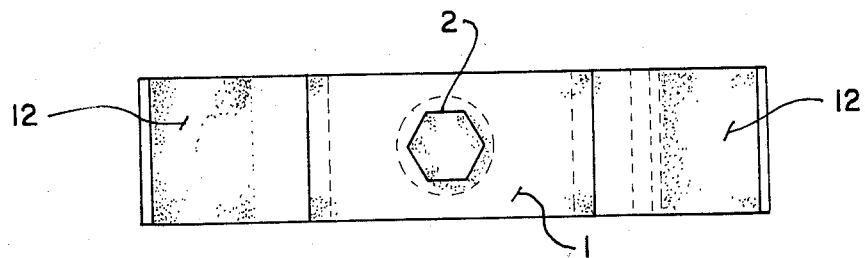
FIG. 7.

APPARATUS FOR SUPPORTING FIBER OPTIC OR RELATED CABLE

BACKGROUND OF THE INVENTION

This invention relates generally to apparatus for supporting cables which includes a bracket formed as a light weight extrusion, designed for holding a plurality of cables, preferably of the fiber optic type, at a position slightly displaced from the utility or other pole to which the cable is intended to mount.

There are a variety of brackets available in the prior art for holding cable in place. Most of these brackets relate to a support for cables in the category of grounding wires, and other conductor lines; the current invention is fabricated to provide means for supporting a variety of cables to a utility or other pole, through the application of an individual bracket. Examples of the prior art can be found in U.S. Pat. No. 3,794,751 identified as a Cable Support Bracket.

Other patents relating to this technology include U.S. Pat. Nos. 2,430,378, 2,275,019, and 3,288,918. In addition, other United States patents include U.S. Pat. Nos. 2,022,386, 2,224,436, 2,241,739, 3,197,164, and 3,210,030. These are examples of various types of devices, known to applicant, relating to brackets providing means for supporting a cable, or the like.

In view of the foregoing, it is a principal object of the current invention to provide a bracket for use for holding a plurality of cables, in the category of the fiber optic form of wire, in their support upon the utility pole.

Another object of this invention is to provide a bracket that can be used for holding and orienting cable in a horizontal position, in its extension between adjacent poles, or function as the bracket useful for supporting cable as it extends approximately vertically into the ground, or to other termination.

Another object of this invention is to provide means shaped integrally into the construction of the extruded bracket, and which means in the form of cradles are designed for holding a plurality of cables, to the bracket, but conveniently spacedly arranged upon the same.

Another object of this invention is to provide a bracket that can be easily and facilely applied to a utility or other pole, and have cables immediately mounted upon it, through the use of facile ties, to expedite but yet sturdily support the application of a cable(s) to the bracket, and hence, to its supporting utility pole.

Another object of this invention is to provide an extruded bracket convenient for holding a variety of cables to a utility pole.

These and other objects may become more apparent to those skilled in the art upon reviewing the summary of this invention, and upon undertaking a study of the description of its preferred embodiment, in view of the drawings.

SUMMARY OF THE INVENTION

This invention contemplates the formation of a bracket, preferably extruded of metal, such as aluminum, to afford the very light weight bracket that can be easily manipulated by the utility man, when high up upon a utility pole, for not only facilitating the installation of the bracket to the pole, but likewise to simplify the mounting of cables to the bracket after its installation. Fiber optic cables are currently in vogue, being installed in abundance around this country, principally for use as a means for the transmission of signals for telephone service, or the like. Such cables are reasonably light weight, and can easily be supported by lighter weight brackets, of the type of metallic, or other material, extrusion, as identified herein. Furthermore, the mounting of the cables to the bracket can be achieved under circumstances which do not require the firm and rigid clamping of the cables in place, such as is done and required with other forms of standard and contemporary cable, as fabricated of metal wire, but in lieu thereof, fiber optic cables can simply be held in position by means of ties, such as the helical type tie or conductor clamps as shown and explained in this application. Cushioning and insulating such cable from the bracket is a rather simple and convenient task, necessitating only the use of a grommet, such as a cut length of sleeve, of the type that may be fabricated of rubber or polymer, and which is only of a slightly greater diameter than the diameter of the cable it supports, when cradled into position and held with respect to the supporting bracket of this invention.

The bracket as developed and explained herein is generally formed having a base member which is designed for cooperating with a fastener, such as a bolt or screw, or other clamp, and which firmly holds the bracket to the utility or other pole, whether it be at its upper end, as rested upon a cross arm, or directly to the pole itself, where the bracket is designed for holding a grounding cable, or other cable that is intended for entering into an underground position. The base member integrally includes a shank portion, that is designed having that length necessary for extending the held cable away from the pole for a sufficient distance, depending upon the type of optic cable being held, to avoid any interference due to the proximity of the cable with its supporting pole, or other structure. The actual means for supporting the cable(s) in place, includes a series of arms, at least two in number, that bifurcate from the opposite end of the shank portion, and which project outwardly for that distance desired for displacement of the held cable from its supporting pole. Initially, the arms extend away from the shank portion, in a bifurcated manner, and provide a cradle like location intermediate thereof, and to which one of the fiber optic cables may be supported, as upon installation. In addition, the outwardly disposed ends of each arm also include a cradle-like means, for supporting additional cables in proximity thereto. These arm end cradle means include either angulated members, or arcuate members, designed for embracing a cable in place, and to which the cable may be tied, by means of the type of tie means as previously explained, and cushioned and insulated through the use of one of the identified types of grommets, or other insulator. Preferably, each cradle means may be formed of a pair of integral walls, having an angular relationship with respect to each other, preferably disposed at approximately ninety degrees apart, and into which a cable may be easily slid, and held in position by means of the type of fastening means as previously explained. In order to assure rigidity for the bracket at its cradle means location, the walls may have turned edges, to add reinforcement at these locations.

Once the bracket means of the current invention is installed in place, upon the utility pole, it may be used for either supporting the fiber optic or other cables in their horizontal extension between adjacent poles, or the bracket may be mounted to the pole, more vertically oriented, for holding and supporting the cable(s) as they extend into the ground, or connect with other termination.

BRIEF DESCRIPTION OF THE DRAWINGS

In referring to the drawings.

FIG. 3 is a top view of the bracket;

FIG. 4 is a left side view of the bracket;

FIG. 5 is a front view of the bracket;

FIG. 6 is a right side view of the bracket showing the screw or bolt useful for holding the bracket to a utility pole, cross arm, or other support; and FIG. 7 is a bottom view of the bracket of this invention.

DESCRIPTION OF THE PREFERRED EMBODIMENT

Figure 1:
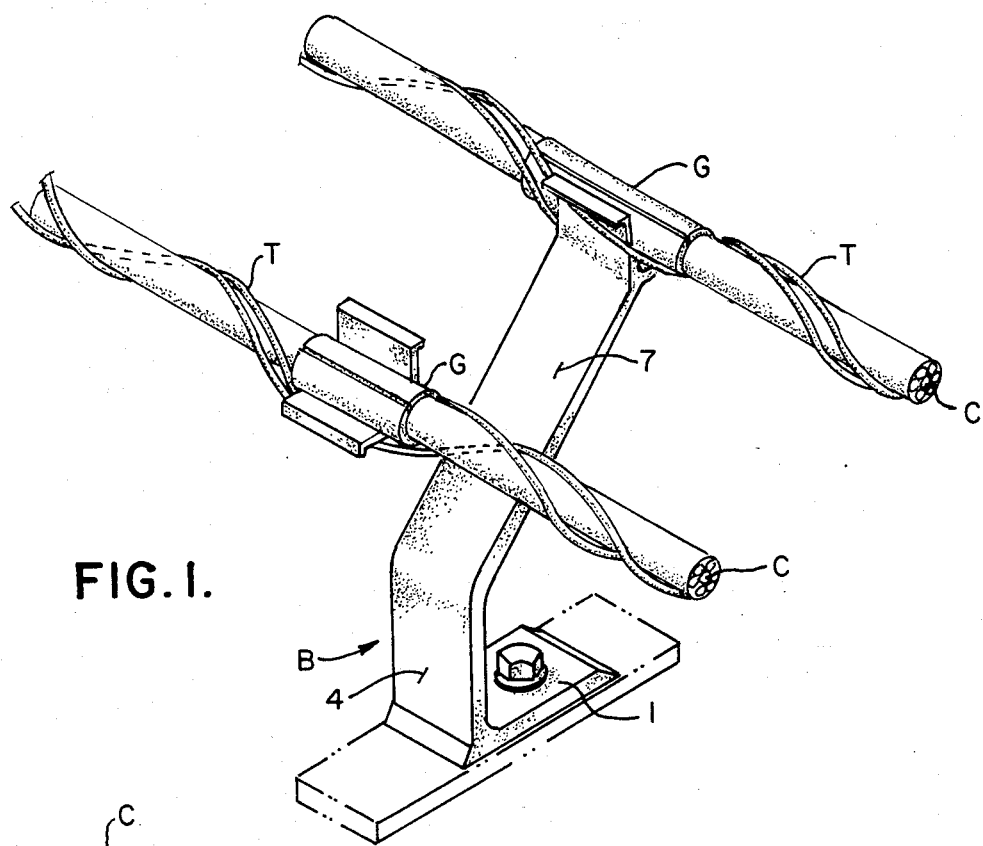
FIG. 1 is an isometric view of the bracket for fiber optic and related cable of this invention, shown mounting two such cables horizontally in place.
Figure 2:
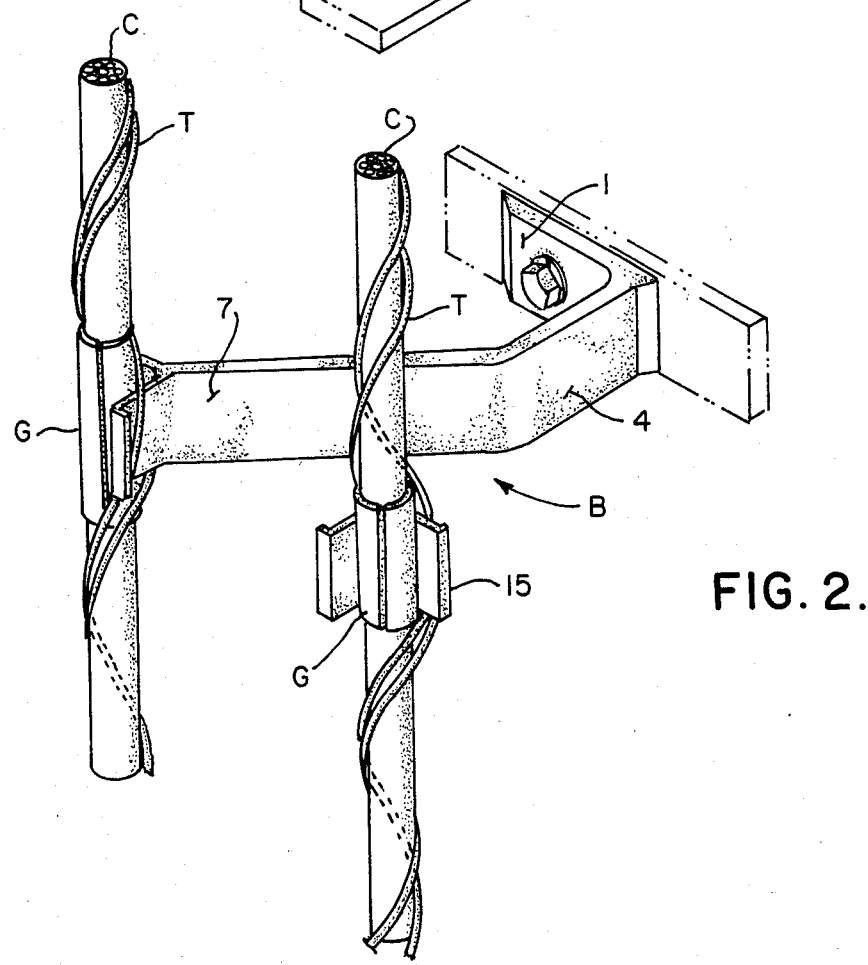
FIG. 2 is a view of the same bracket, vertically mounted for holding such cable in a more vertical oriented position.

In referring to the drawings, and in particular FIGS. 1 and 2, the bracket B of this invention is clearly disclosed, in two types of installations, FIG. 1 is the mount showing the bracket as mounted upon, as for example, a cross arm, proximate the top of a utility or other pole. FIG. 2 discloses the bracket as mounted for providing vertical installation of cables. As can be seen, each of the cables is disclosed as comprising fiber optic cables, as at C, and is held into position upon the bracket by means of the tie means T, which may comprise a form of helical wound wire or polymer having resiliency so as to facilitate its wrap around the cable C, and part of the bracket, for retention of the respective cables in place. In addition, in order to add to the mount of the cables to the bracket, grommets, as at G, comprising a length of split sleeve formed of a cushioning polymer, or rubber, are initially wrapped around the respective cable C, before the helical tie T is wrapped in place.

More specifically, the bracket B of this invention, as can be seen in FIG. 5, includes a base member 1 which has an aperture 2 provided therethrough, and through which the fastener, such as the bolt or screw 3, as shown, secures. This is useful for mounting the base member 1 of the bracket B to a cross arm, or for applying the bracket by means of a screw, or the like, to a utility pole, or other supporting structure. A shank portion 4 extends integrally upwardly from the base member 1, and may be bent, as shown at 5, so as to facilitate the orientation of the bracket, centrally over its base member 1, as can be noted. The upper end of the shank portion 4 bifurcates into a pair of arms 6 and 7, having an angled relationship intermediate thereof, and within this angled portion, as at 8, one of the cables C may be located, having its grommet G arranged therearound, and be secured into position by means of a helical tie, or other tie means, as previously explained. One end of each arm 6 and 7 is integrally formed and extruded with the shank portion 4, while the opposite end of each arm, or the extended ends, as at 9 and 10, is formed into a cradle like member 11, each being formed of a pair of walls, as at 12 and 13, and being angular with respect to each other. In this particular instance, it can be seen that the pair of walls 12 and 13, for each cradle means, is formed at approximately a right angle, so as to form this angled relationship for use for embracing the cable C and the grommet G, when positioned upon the bracket, as shown. In addition, these cradle means likewise may be shaped rather arcuately, as shown at 14, so as to provide a continuous and complementary support for the cable and its grommet, therein, to prevent or minimize the compression of the tie means upon its holding of the cable into its fixed position.

As previously summarized, this bracket may be formed as an extrusion, and then cut to the various widths, as noted, and preferably is formed of light weight aluminum, in order to facilitate its mounting and application by the lineman, but yet have sufficient sturdiness and strength so as to support for a significant length of time the various fiber optic or other cables high upon a utility pole.

As can also be seen in FIG. 5, each of the angled walls 12 and 13 may have turned outer edges, as at 15, so as to add to the strength of the bracket, and its cradle means, at these locations. In addition, as can be noted in FIGS. 1 and 2, these turned edges 15 are useful for providing means for gripping of the tie means T, so as to assure that they remain into position, for holding a cable contiguously against the bracket B, and more specifically within its respective cradle means 11, as noted. Without these turned edges 15, or other equivalent structure, the tie may slip off of the angled walls 12 or 13, and simply be wrapped around the cable itself, without having an adherence or tie against the bracket B. Under those conditions, there would be nothing holding the cable in place, and it could, when it encounters wind forces, or the like, shift out of its cradle support, and become free of its mounting bracket B.

Variations or modifications to the fabrication and construction of the bracket of this invention, within the scope of the appended claims, may occur to those skilled in the art upon reviewing the disclosure herein. Such variations or modifications, if within the spirit of this invention, are intended to be encompassed within the scope of any claims to patent protection issuing upon this invention. The description of the preferred embodiment set forth herein is done so for illustrative purposes only.

Having thus described the invention what is claimed and desired to be secured by Letters Patent is:

1. Apparatus for supporting fiber optic or related cable upon a utility pole or the like, comprising, a fully integral bracket having a base means disposed for attachment with a pole or the like, a shank means integrally connected with said base means and provided for extension away therefrom, cable supporting means bifurcating from said shank means, each cable supporting means including an arm, each arm at one end connecting with the shank means, and each arm extending to an outer end away from said shank means, and cradle means provided at the outer end of each arm and disposed for supporting a cable therewith, said arms together being V-shaped in their extension from the shank means, each cradle means including members for embracing a cable during installation, and said members comprising a pair of integral walls, said walls having an angular relationship with respect to each other, and disposed for holding a cable therein during installation.

2. The invention of claim 1 and wherein said pair of walls are disposed with respect to each other at a ninety degree angle.

3. The invention of claim 2 and wherein each wall has a turned edge for reinforcing the cradle means during its cable support.

4. The invetion of claim 1 and wherein said bracket comprises a metal extrusion.

5. The invention of claim 4 and wherein said metal extrusion is formed of aluminum.

6. The invention of claim 1 and including fastening means for cooperating with each of the cradle means for holding at least one cable to the bracket.

7. The invention of claim 6 and including grommets for seating within each cradle means for surrounding cables when installed therein, and for cooperating with the fastening means for providing a cushioned and insulated support for each cable during installation.

8. The invention of claim 7 and wherein each grommet comprises a sleeve of a polymer or rubber.

9. The invention of claim 8 and wherein said fastening means comprises a length of helical tie.

10. The invention of claim 1 and wherein the cradle means open away from each other.

11. The invention of claim 1 and wherein there is a cradle means formed between the arms extending away from the shank means.

12. The invention of claim 1 and wherein said shank means is bent above its extension from the base means and aligns the arms centrally over the base means.

* * * * *